April 5, 1960 W. SCHWEIZER ET AL 2,931,164
BALANCE WHEEL SPRING-END MOUNTING
Filed April 1, 1958 2 Sheets-Sheet 1
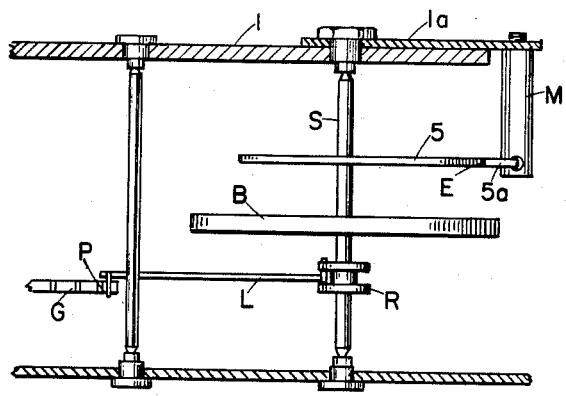
FIG.1
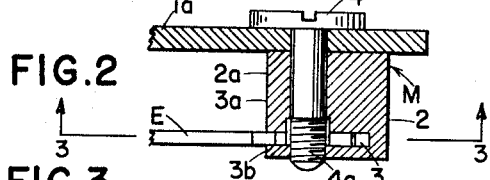
FIG.2
FIG.3
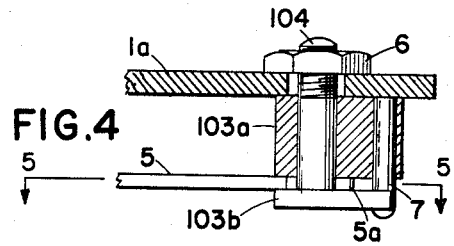
FIG.4
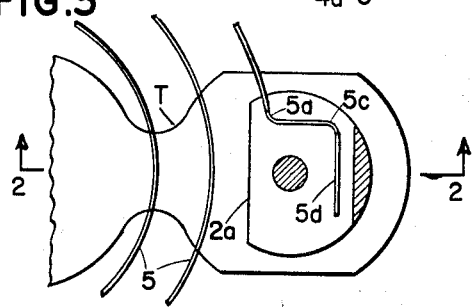
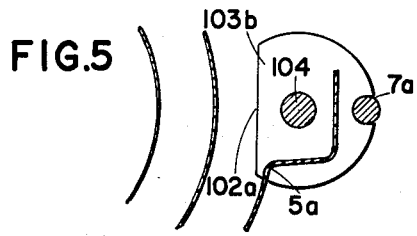
FIG.5
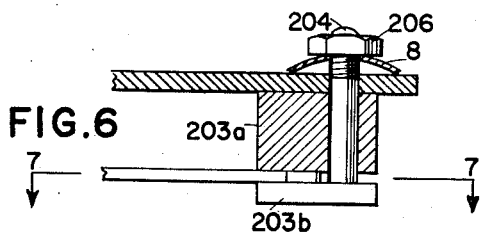
FIG.6
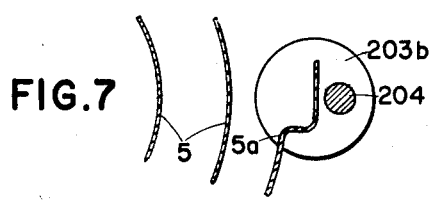
FIG.7

United States Patent Office 2,931,164
Patented Apr. 5, 1960

2,931,164

BALANCE WHEEL SPRING-END MOUNTING

Walter Schweizer, Schwenningen (Neckar), Ernst Glünz, Trossingen, and Ernst Müller, Schwenningen (Neckar), Germany, assignors to Kienzle Uhrenfabriken A.G., Schwenningen (Neckar), Germany, a corporation of Germany Application April 1, 1958, Serial No. 725,643

10 Claims. (Cl. 58—115)

This invention relates to a process or means for fastening the outer end of a spiral spring in motion regulators such as in clockworks and the like.

In the heretofore known methods for fastening the outer end of such springs there was no regard given the range of tolerable positions of the end of the spring when tension-free. There are methods known wherein the outer end is clamped fast to the clockwork frame in which the so-called "balance-out" method is used wherein the end is provided with a bend and fastened to a little post by the aid of a little pin.

Another process is one wherein the spring according to the balancing out in the same or similar fashion but outside the works and in a block, and according to the setting of the balance wheel, the block is then fastened to the frame.

Lastly are processes especially known in escapements, in which the outer spring end is held between two small opposed rollers and by turning the rollers, the spring is drawn to the correct tension. In this manner by turning of the rollers, the condition of the spring is made to approach the proper degree of curvature.

All these means for fastening the spring ends have disadvantages. In the production and shaping, such as attends the fastening of the inner end to a shaft or balance wheel as the case may be, the spring and therefore its outer end, become liable to distorsion from the preconceived form. Likewise fastening means arranged on the frame is subject to being out of the range of tolerance for intended use. All these deviations from the regular tolerance result in an introduction of error in isochronism or "limping" due to the outer end of the spring not being attached to the frame in its proper special relationship due to deformation and tension. In order to reduce these errors it is necessary to manually correct the spring with tweezers, twisting part of the spring hub on the shaft or even as the case may require replacing pins on the spring ends. Hence the elastic properties of the spiral spring and therefore the characteristics of the oscillating system are altered in such a manner that errors in isochronism arise despite appropriate manual manipulations.

Moreover these operations require a high degree of skill and because of the varying degrees of experience of the operators, considerable variations arise in the fabricated product.

These disadvantages are overcome in the present invention in that, the balance wheel with the inner end of the spring fastened thereon, is turned to proper position and the outer end of the spring is fixed on the frame within three dimensional tolerances so that the spring undergoes no alteration in form, shape or stress. This can be obtained approximately by mechanical means as well as perfectly by having a hardening material to set and fix the outer end in correct position.

In the accompanying drawing showing, by way of example, several of many possible embodiments of the invention, Fig. 1 shows a clockwork schematically including a mount for a spring end.

Fig. 2 shows one form of the mount;

Fig. 3 is a sectional view of the mount of Fig. 2 the section being taken substantially along the line 3—3 of Fig. 2 looking in the direction of the arrows of said line;

Fig. 4 shows another form of the mount;

Fig. 5 is a sectional view of the mount shown in Fig. 4, the section being taken along the line 5—5 of Fig. 4 looking in the direction of the arrows of said line.

Fig. 6 shows another form of the mount.

Fig. 7 is a sectional view of the mount of Fig. 6, the section being taken along the line 7—7 of Fig. 6 looking in the direction of the arrows of said line;

Figure 8:
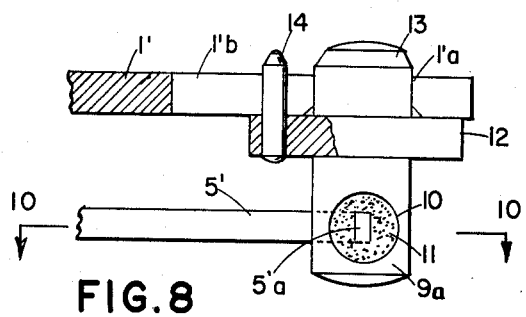
Figs. 8 and 9 show another form of the invention.

The invention is shown in connection with a conventional clockwork escapement system where a frame 1 carries a balance staff S having a balance wheel B, and a roller R, the latter cooperating with a lever L having pallet pins P to engage an escapement gear G. The staff carries a hair or spiral spring 5 having the inner end thereof fixed in a known manner on the staff. The edges of the spring are shown as E. The outer end position 5a of the spring is secured to the frame 1 or a part 1a substantially secured thereon by a mount M shown in a schematic form. The part 1a may be a portion of the balance wheel block for the bearing. It is with the details of the mount and the use thereof that this invention is concerned.

The mount as shown in Figs. 2 and 3 comprises a substantially cylindrical post 2 substantially secured to the frame 1 (or the part 1a) adjacent the spring in the approximately correct position for the outer end 5a of the spring. Due to the proximity to the spring it is preferable that the post be cut off longitudinally leaving a flat side face 2a clear of the spring coils. The post is provided with a deep transverse slot 3 coplanar with the spring and open at the face 2a to form outer and inner clamping members 3b and 3a at each side of the slot. A screw 4 passes through the outer member 3a from the exterior of the frame and post and is in threaded engagement with the clamping member 3b as at 4a for drawing the two members together.

The outer end portion of the spring is substantially coplanar with the remainder of the spring but is provided with two approximately right angle bends at 5a, 5c so that when the end portion 5d is disposed in the slot it may somewhat embrace the screw and yet be allowed movement, radial and angular, with respect to the staff. The slot 3 is deep enough to allow radial movement of the end 5d when the latter is radially outer of the screw.

In assembly, the staff and spring are turned to correct or nul position so that the outer end portion is free to assume the proper position within the slot without stressing the spring in any way. It is of course to be assumed that the post has been so located roughly that the end position will lie somewhere within the slot in strain-free condition. After the spring end is disposed in strain-free condition in the slot the screw 4 is drawn up to tighten the clamping members on the edges E of the spring, the slot being so deep that the clamping members remain substantially parallel. The part 1a may be provided with a reduced cross sectional area T to allow bending of the part and so increase the tolerance.

In the form of the invention as shown in Figs. 4 and 5 the construction is quite similar to that already described. However instead of having the clamping members integrally joined the outer and inner members are here separate as 103a and 103b the former being secured to the frame 1. Tightening of the members is by a bolt 104 fast on the inner member and passing through the outer, where it is provided with a nut 6. Relative rotations of the members are prevented by a pin 7 fast on one member such as 103a and slidable in a detent grove 7a in the other member such as 103b. Preferably the members are cut off at 102a so as not to interfere with the spring.

In another form of the invention as shown in Figs. 6 and 7 the clamping members 203a and 203b are substantially the same as those corresponding parts 103a and 103b except that they are fully cylindrical and the bolt or brad member 204 is not threaded and is eccentric to the clamping members. A force-fit washer 206 and spring washer 8 thereunder on the bolt 204 perform functions somewhat similar to those of the nut 6 in Fig. 4. Since the stud 204 is eccentric, the spring end portion 5d need not embrace the brad member but may be wholly inner thereof as in Fig. 7.

It is self evident that in the forms of the invention thus far described in detail, the clamping members, within tolerable ranges of considerable degree both radially and angular with respect to the staff S may be squeezed on the spring and without deformation or flexure injurious to the spring. The end can be moved angularly, before clamping, to enable its proper relation in space with regard to the escapement mechanism. The positions of tolerance normal to the plane of the spring can be obtained by bending the part 1a before clamping if the post 2 is short. Part 1a may be an integral part of a pivot-bearing block for the balance wheel.

Figure 10:
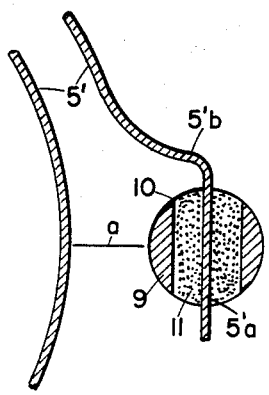
Fig. 10 is a sectional view of the invention according to Figs. 8 and 9 the section being taken substantially along the line 10—10 of Fig. 8 looking in the direction of the arrows of said line.
Figure 9:
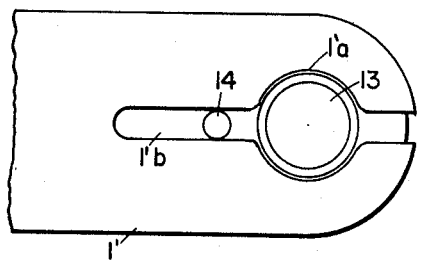

In the form of the invention as shown in Figs. 8, 9 and 10 the mount is shown attached to a part 1' of the frame such as the balance-wheel bearing block and of resilient material. The part 1' is provided with a longitudinal slit 1'b enlarged at a portion to form a hole 1'a for receiving a stud end 13 of a cylindrical block 9 clamp wise under slight pressure due to the resilience of part 1'. A collar 12 fast about the block is provided with a small stay pin 14 projecting into the slit 1'b to prevent turning of the block.

The block is provided with a transverse bore 10 appreciably larger than the end portion 5'a of the spring 5a, the spring being provided with a knee bend 5'b as in Fig. 10, to provide a distance a between the block and spring when the end portion lies in the bore. The end portion is led into and positioned in the bore 10 in very much the same manner as described above and set fast in the bore, tension-free, by a hardenable binding agent 11 such as adhesive cement, plastic or synthetic resin, solder, lace, mastic, putty and the like.

Figure 11:
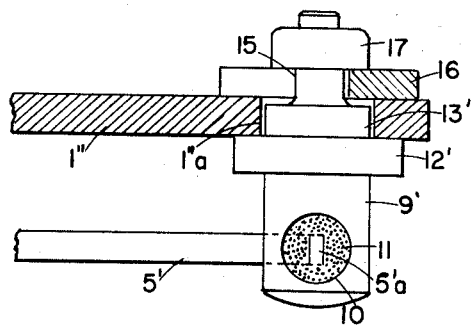
Fig. 11 shows a modification of the invention similar to that shown in Fig. 8.

A further modification of the invention is shown in Fig. 11 which is quite similar to that of Fig. 8. Herein is the block 9' similar to the block 9 though the balance-wheel mounting-part 1'' is provided with only a hole 1''a in which a stud portion 13' on the block 9' is disposed, preferably with play during assembly and then tightened by means of a projection 15 from the portion 13' which is fitted with a lock washer 16 and tightening means such as forced collar 17. The spring is set in a cement as in Fig. 8.

Preferably the block or parts 1a or 1' are of light weight material such as aluminum as the spring can be most easily inserted when the part can be deformed.

Many variations of the invention are possible. The blocks or posts 9 and 9' may be integral with the parts on which they are mounted, nor need the holes be round. The posts may be mounted with cementing means such as thermoplastic and the posts may even be of cementing material formed by a casting process and the post cast about the spring end.

The invention claimed is:

1. In a balance wheel system for a clockwork and the like having a frame, a balance wheel shaft mounted for oscillation; a spiral spring having the inner end secured to the shaft, said spring having an outer end portion having a pre-formed angular bend therein, the spring end portion having edges lying substantially in closely spaced parallel planes, a device substantially fixed with respect to the frame for holding a part of said outer end portion at a point radially outward from the bend, and means on the device for engaging only said edges tightly and simultaneously without moving said outer end portion in a direction parallel with said planes.

2. In a system as claimed in claim 1, said means being a clamp having jaws adapted to engage against said edges respectively.

3. In a system as claimed in claim 2, said jaws being provided by a slot in the device, which slot is of approximately the same width as the distance between the edges of the spring.

4. A process for mounting spiral hair springs in escapement systems wherein the outer end of the spring is to be fixed in a recess in a mounting piece on the frame of a clockwork and the inner end has been fixed to a mounted balance wheel shaft, said process comprising rotating the shaft to position for escapement corresponding to neutrality in the spring while allowing the outer end portion of the spring to move strain-free in all directions in the plane of the spring and in the recess and then fixing the spring outer end portion in the recess substantially without movement in the plane of the spring.

5. A process as claimed in claim 4 said fixing being accomplished by urging the walls of the recess together on said end portion and toward the general plane of the spring.

6. A process as claimed in claim 4 said fixing including the application of a soft, hardenable, cement about the end portion into the recess.

7. In a clockwork a balance wheel shaft and a substantially monoplanar hair spring fixed thereon; a frame for mounting the shaft; a slotted block on the frame, the outer end portion of the spring lying within the slot of the block, and a screw passing through the block normal to the plane of the spring for tending to close the slot, when the screw is in tightening position, the side walls of the slot being smooth to allow movement of the outer end of the spring freely in all directions parallel with the general plane of the spring within the slot while said screw is in non-tightening position.

8. In a clockwork, a balance wheel shaft and a substantially monoplanar hair spring of strip material therein; the spring having an outer end portion substantially in the plane of the body of the spring and provided with at least one angular bend; a frame for mounting the shaft, and a clamp mounted on the frame and provided with smooth flat opposed jaw faces substantially parallel with and adjacent to the plane of the spring to permit receiving of the end portion and allow motion of the portion in all directions parallel with the spring so that the end portion may freely lie in the clamp and the spring be substantially strain-free when the shaft is turned to a predetermined position and the clamp is in non-tightened position, said angular bend being provided to prevent twisting of the spring when the clamp is closed upon the edges of the spring and at said bend.

9. In a clockwork as claimed in claim 8, said clamp comprising a slotted block, the walls of the slot of the block being said jaw faces.

10. A process for assembly of clockwork escapement mechanism wherein a hair spring has been secured to a balance wheel shaft and the outer end portion of the spring is to be secured fast with respect to a part of the clockwork, said process comprising turning the shaft to nul position while allowing the end portion to turn about the axis of the shaft and move radially therefrom substantially without restraint to leave the end portion strain-free and then securing the end portion to a substantially fixed part of the clockwork and substantially free from stress in any direction parallel with the general plane of the spring.

References Cited in the file of this patent

UNITED STATES PATENTS

| | | |
|---|---|---|
| 149,795 | Shaw | Apr. 14, 1874 |
| 783,621 | Cunningham | Feb. 28, 1905 |
| 846,308 | Horn | Mar. 5, 1907 |
| 2,649,684 | Dolby | Aug. 25, 1953 |

FOREIGN PATENTS

| | | |
|---|---|---|
| 49,000 | Switzerland | Feb. 5, 1910 |
| 261,671 | Switzerland | Sept. 1, 1949 |